(12) United States Patent
Foerster et al.

(10) Patent No.: US 6,228,292 B1
(45) Date of Patent: May 8, 2001

(54) PROCESS FOR THE PREPARATION OF PULVERULENT HETEROGENEOUS SUBSTANCES

(75) Inventors: Martin Foerster, Büdingen; Andreas Gutsch, Ranstadt; Rainer Domesle, Alzenau-Kälberau; Ralph Kiessling, Limeshain; Oliver Stöhr, Fulda, all of (DE)

(73) Assignee: Degussa AG, Düsseldorf (DE)

(*) Notice: Subject to any disclaimer, the term of this patent is extended or adjusted under 35 U.S.C. 154(b) by 0 days.

(21) Appl. No.: 09/309,504

(22) Filed: May 11, 1999

Related U.S. Application Data

(60) Provisional application No. 60/105,392, filed on Oct. 23, 1998.

(30) Foreign Application Priority Data

May 12, 1998 (DE) ................................. 198 21 144

(51) Int. Cl.⁷ ....................................... B29B 9/00
(52) U.S. Cl. ....................................... 264/7; 264/5; 264/10
(58) Field of Search ........................................ 264/5, 7, 10

(56) References Cited

U.S. PATENT DOCUMENTS

| | | | |
|---|---|---|---|
| 2,560,357 | 7/1951 | Martin | 202/6 |
| 4,627,943 | 12/1986 | Seidler | 264/14 |
| 4,719,095 | 1/1988 | Abe | 423/346 |

FOREIGN PATENT DOCUMENTS

| | | |
|---|---|---|
| 114 454 | 8/1975 | (DE). |
| 0295389 | 12/1988 | (EP). |
| 0677326 | 10/1995 | (EP). |
| 0681989 | 11/1995 | (EP). |
| 9-086923 | 3/1997 | (JP). |
| 89/08610 | 9/1989 | (WO). |

*Primary Examiner*—Mary Lynn Theisen
(74) *Attorney, Agent, or Firm*—Smith, Gambrell & Russell, LLP

(57) ABSTRACT

A suspension, dispersion or emulsion is introduced into a burner. A two-stage after-treatment is then carried out. The resulting powder can be employed as a catalyst.

15 Claims, 1 Drawing Sheet

PROCESS FOR THE PREPARATION OF PULVERULENT HETEROGENEOUS SUBSTANCES

REFERENCE TO A RELATED APPLICATION

This application is a continuation-in-part of our copending provisional application Ser. No. 60/105,392 filed Oct. 23, 1998 which is relied on and incorporated herein by reference.

INTRODUCTION AND BACKGROUND

The present invention relates to a process for the preparation of pulverulent heterogeneous substances.

It is known to prepare pulverulent heterogeneous substances from oxides and salts starting from a suspension, dispersion or emulsion.

Spray driers or similar apparatus are usually employed for the drying of suspensions, dispersions or emulsions. This is followed by a rotary tube or equivalent apparatus for calcining. With such prior known methods the losses of powder by cleaning and handling, and also during operation of the plant are or can be considerable; also the labor costs can be high.

Drying and calcining in batches (for example in vessels in a muffle furnace) can be used as an alternative. However, there is the risk with such apparatus of a very wide range of product quality due to diffusion processes and temperature gradients in the powder.

It is therefore an object of the present invention to prepare pulverulent heterogeneous substances and to overcome the disadvantages of prior known methods.

SUMMARY OF THE INVENTION

The above and other objects can be achieved according to the present invention by introducing a dispersion, suspension or emulsion into a turbulent or laminar burner. This dispersion, suspension or emulsion is then treated there under the conditions established therein to produce a reaction mixture. The resulting reaction mixture is then introduced into a downstream flow-through tube, where the powder is further treated. The powder is subsequently fed, optionally, to a washer, a separator or a filter, and, optionally, subjected to a further treatment there. Subsequently, the pulverulent product can be transported further via any appropriate device.

BRIEF DESCRIPTION OF DRAWING

The present invention will be further understood with reference to the accompanying drawing which is a schematic flow diagram of the process of the invention.

DETAILED DESCRIPTION OF INVENTION

Figure 1:
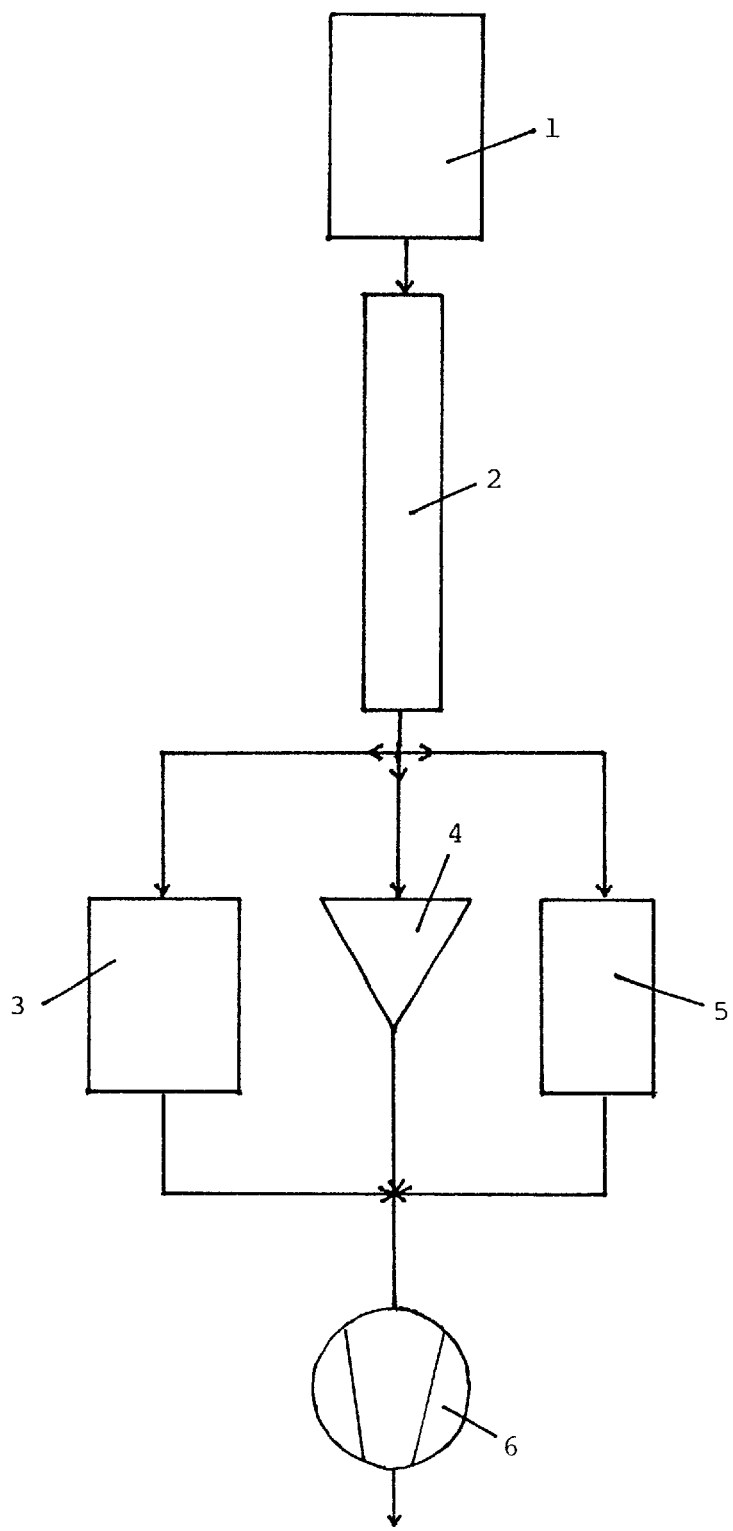

The present invention will now be described in further detail with reference to the accompanying drawing. In carrying out the process of this invention, in the high temperature flow reactor, the dispersion, suspension or emulsion can be present as a gas-borne group of particles.

The high temperature flow reactor can be heated by feeding in non-combustible hot gases.

The high temperature flow reactor can be heated indirectly by heating up the walls of the reactor adjacent to the reaction space where the reaction takes place.

Heating can be achieved in this embodiment by electrical plasma and/or inductive plasma.

A high-energy laser light beam and/or microwave energy can additionally be used as an energy source for the high temperature flow reactor.

In addition to the dispersion, suspension or emulsion, non-combustible reactive gases or vapours can be fed to the high temperature flow reactor, it being possible for the reaction product to be a highly dispersed nanostructured solid which adds on to the surface of the particles of the dispersion, emulsion or suspension.

The reaction product can form homogeneous molecular layers on the particles of the dispersion, emulsion or suspension, the particles of the dispersion, emulsion or suspension being coated with a mono- or multimolecular layer.

The non-combustible reactive gases or vapours can be metal chlorides and/or organometallic compounds, as well as mixtures of these compounds.

The temperature in the reaction space can be above 1000° C.

The suspension, dispersion or emulsion can be fed to the reaction space axially in co- or countercurrent or radially.

The dispersion, emulsion or suspension can be fed to the reaction space radially.

The dispersion, emulsion or suspension can be a solids suspension, a solution, powder, pastes, melts or granules with or without dissolved "salts". The dispersion, emulsion or suspension is metered into the space in finely divided form by atomizing, wave-breaking, as a mist or jet.

The secondary gas mentioned in the figure can be air, ambient air with oxygen contents of between 0 and 100%, dry or humid, water vapour, other vapours or gases, nitrogen and the like.

The burner can be of a known design with pulsatory combustion. Such a burner is described in the document DD 114 454 which is relied on and incorporated by reference herein.

A burner of high turbulence can preferably be employed to improve the transportation of material. In particular, a spinning burner, possibly with an overlaid pulsation, can be employed.

The liquid phase of the suspension, dispersion or emulsion can be water, alcohol, liquid organic hydrocarbons or organic solvents.

The components present as the solid in the suspension, dispersion or emulsion can be, individually or as a mixture: oxides, nitrides or carbides of aluminum, silicon, cerium, zirconium, titanium, crystallized-out salts of aluminum, silicon, cerium, zirconium, lanthanum, barium, metals such as, for example, nickel, silver, palladium, gold, rhodium, platinum, as well as carbon black and organic compounds.

The dissolved or non-dissolved salts can be nitrates, acetates, carbonates, chlorides of aluminum, cerium, silicon, zirconium, titanium, lanthanum, barium, platinum, rhodium, palladium, iridium, potassium, calcium and ammonium and mixtures of these components.

A combustible gas, such as, for example, hydrogen and/or methane, can be used as the fuel.

The temperature in the burner can be 500 to 2000° C.

The temperature after the burner and the reducing or oxidizing atmosphere in the flow-through tube can be established via the ratio of oxygen (from the combustion air) to hydrogen and the flow rates. Moreover, further reactive or inert gases and vapours can be fed into the tube.

The dispersion, emulsion or suspension of the solid can be sprayed or dripped into the flame of the burner.

The water or the solvent evaporates and the powder formed is calcined, oxidized or reduced and sintered at high temperatures in the gas atmosphere present. The residence time of the powder in the hot gas phase can be varied in the range from 0.01 second up to minutes by the separating device (cyclone, high temperature filter). The mass and heat transfer is significantly better than in a rotary tube or in a muffle furnace.

With spray calcining, the surfaces to be cleaned are considerably smaller compared with a spray drier with subsequent calcining in a rotary tube and the losses of substance are low. Due to the use of a continuous process, the range of product quality is narrow. Compared with the rotary tube, the losses during start-up and shut-down are very low.

The powder in the waste air filters/cyclone of a rotary tube has a wide range of product quality and often cannot be used, while in the process according to the invention the range of product quality in the waste air filter/cyclone is a very narrow range.

The in situ treatment of the waste air can have an effect as a further advantage. The salts are often nitrates, acetates and ammonium compounds, the decomposition products of which, NO, $NH_3$ and CHNO, can be reduced in amount by adjusting the composition of the hot waste gases or can be treated in a downstream catalyst without additional heating up.

The products which can be prepared are heterogeneous powders/granules:
1. Mixed agglomerates and/or mixed aggregates of different oxides/metals/nitrides/carbides/carbon black.
2. Base substances (support material) (possibly in shell form) impregnated/covered/coated with oxides/metals/nitrides/carbides.
3. Combination of 1. and 2.

The substances prepared according to the invention can be employed as a catalyst, for the production of ductile ceramic components, for the production of components with a quantum mechanics activity, in particular sensors and photoelectrically active emitters, and as oxygen stores, $NO_x$ stores, $C_nH_m$ stores for catalysis and adsorbents.

The process according to the invention is shown and explained in more detail in the drawing:

FIG. 1 shows a burner 1, to which the flow-through tube 2 is connected. The washer 3, the separator 4, the filter 5 and the fan 6 are connected to the flow-through tube 2.

In the process according to the invention, a dispersion, suspension or emulsion, a secondary gas, combustion air and fuel are introduced into the burner 1. The reaction mixture reacted in the burner 1 is introduced into the flow-through tube 2. A reducing or oxidizing gas atmosphere can be established in the flow-through tube 2. The reacted reaction mixture can be treated in the flow-through tube 2 such that
a) the dispersion, suspension or emulsion is dried,
b) the water of crystallization is driven off,
c) the powder is calcined, substances such as nitrates, acetates, carbonates being decomposed to gases,
d) the powder is oxidized or reduced,
e) the powder is sintered,
f) the specific surface area of the powder is decreased.

After passage through the flow-through tube 2, the powder can be treated in the washer 3 if a dispersion is to be prepared or if contact with air is to be avoided.

Alternatively, after leaving the flow-through tube 2, the powder can be separated off via the separating device 4, for example, for brief treatment at high temperatures.

In another alternative, the powder can be separated off by means of the filter 5 for a longer treatment at high temperatures.

The waste gas can be discharged by means of the fan 6.

The following examples are illustrative of the present invention.

EXAMPLE 1

An aluminum oxide/water suspension with dissolved platinum nitrate is introduced into the burner 1. The suspension comprises
400 g/l aluminum oxide
10 g/l platinum nitrate
800 g/l water.

Hydrogen is employed as the fuel.

The burner temperature is 1,200° C., and the residence time is approx. 1 sec.

The powder separated off in the cyclone is dry and no longer contains nitrate ions. The platinum is deposited in a finely dispersed form on the surface of the aluminum oxide.

EXAMPLE 2

An aqueous suspension which comprises
400 g/l aluminum oxide,
100 g/l cerium acetate,
100 g/l zirconium nitrate and
800 g/l water
is introduced into the burner 1. Natural gas is employed as the fuel. The burner temperature is 1,000° C. The powder separated off in the cyclone is dry and contains neither acetate ions nor nitrate ions. The cerium oxide and the zirconium oxide are deposited in a finely divided form on the surface of the aluminum oxide.

EXAMPLE 3

A moist powder comprising
78 wt. % aluminum oxide
20 wt. % water
2 wt. % platinum nitrate
is treated with natural gas at a burner temperature of 900° C.

The powder separated off in the cyclone is dry and contains no nitrate ions. The platinum is deposited in a finely divided form on the surface of the aluminum oxide.

By following the procedure set forth in examples 1–3 similar results can be obtain with the oxides, nitrides or carbides of silicon, cerium, zirconium, lanthanum, barium, as well as the corresponding compounds with metals such as, for example, nickel, silver, palladium, gold, rhodium, and platinum. In similar manner, carbon black and organic compounds can also be used in the method of this invention.

Further variations and modifications of the foregoing will be apparent to those skilled in the art and are intended to be encompassed by the claims appended hereto.

German priority application 198 21 144.9 is relied on and incorporated herein by reference.

We claim:

1. A process for the preparation of a pulverulent heterogeneous substance, comprising introducing a dispersion, suspension or emulsion into a turbulent or laminar burner, heating the dispersion, suspension or emulsion under reaction conditions established in said burner to obtain a reaction mixture powder, introducing said reaction mixture powder into a downstream flow through tube, treating said powder with a gas, optionally feeding said powder to a washer, a separator or a filter.

2. The process according to claim 1, wherein said dispersion, suspension or emulsion is present in the high temperature flow through tubes reactor as a gas-borne group of particles.

3. A process according to claim 1, further comprising heating the flow through tube by an exothermic combustion reaction which takes place in the tube.

4. The process according to claim 1, further comprising heating the flow through the tube by feeding in non-combustible hot gases.

5. The process according to claim 1, further comprising heating the flow through tube indirectly by heating up flow through tube walls adjacent a reaction space of said tube.

6. The process according to claim 1, further comprising heating the flow through tube by electrical plasma and/or inductive plasma.

7. The process according to claim 1, further comprising subjecting the flow through tube to a high-energy laser light beam and/or microwave energy.

8. The process according to claim 7, further comprising, in addition to the dispersion, suspension or emulsion in the form of particles, feeding a noncombustible reactive gas or vapour to the flow through tube to produce a reaction product which is a highly dispersed nanostructured solid which adds on to the surface of the particles of the dispersion, suspension or emulsion.

9. The process according to claim 8, wherein the reaction product formed thereby is a homogeneous molecular layer on the particles of the dispersion, suspension, or emulsion, the particles of the dispersion, suspension or emulsion being thereby coated with a mono- or multimolecular layer.

10. The process according to claim 8, wherein the noncombustible reactive gas or vapour is at least one of a metal chloride or organometallic compound.

11. The process according to claim 1, wherein the temperature of the reaction is above 1000° C.

12. The process according to claim 1 wherein the reaction temperature is 500 to 2000° C.

13. The process according to claim 1, wherein the dispersion, suspension or emulsion is fed to the burner axially in co- or countercurrent or radially.

14. The process according to claim 13, wherein the dispersion, suspension or emulsion is fed to the reaction space radially.

15. The process according to claim 1 wherein the powder is in a hot gas phase for at least 0.01 seconds.

* * * * *